United States Patent [19]

Redford

[11] 3,974,877
[45] Aug. 17, 1976

[54] SAND CONTROL METHOD EMPLOYING LOW TEMPERATURE OXIDATION

[75] Inventor: David A. Redford, Fort Saskatchewan, Canada

[73] Assignee: Texaco Exploration Canada Ltd., Calgary, Canada

[22] Filed: June 26, 1974

[21] Appl. No.: 483,481

[52] U.S. Cl. ............................... 166/276; 166/288
[51] Int. Cl.² .................. E21B 43/04; E21B 43/12
[58] Field of Search ........... 166/276, 278, 288, 285, 166/294, 262

[56] References Cited
UNITED STATES PATENTS

| | | | |
|---|---|---|---|
| 1,975,162 | 10/1934 | Layne .............................. | 166/278 |
| 3,182,722 | 5/1965 | Reed ................................ | 166/288 |
| 3,254,716 | 6/1966 | Fitzgerald et al. .................. | 166/288 |
| 3,280,912 | 10/1966 | Sheffield .......................... | 166/294 |
| 3,525,397 | 8/1970 | Darley .............................. | 166/283 |

*Primary Examiner*—Stephen J. Novosad
*Assistant Examiner*—George A. Suckfield
*Attorney, Agent, or Firm*—T. H. Whaley; C. G. Ries; Jack H. Park

[57] ABSTRACT

This invention relates to a method for treating wells completed in subterranean formations to prevent the movement of unconsolidated sand particles from the formation into the well during recovery of formation fluid or away from the well during injection of an extraneous recovery fluid thereinto. The method is especially applicable to formations containing asphaltic or bituminous petroleum, such as tar sand deposits. In one embodiment, granular material such as sand or gravel is introduced into the formation adjacent to the well bore and saturated with bituminous or asphaltic petroleum. The bituminous petroleum naturally occurring in a tar sand material may be used, or bituminous petroleum may be pumped into the sand and gravel. Bituminous petroleum from tar sands is usually too viscous to be pumped in its natural state, so it must first be heated or diluted with a suitable solvent or incorporated into a bitumen-in-water emulsion prior to injection, with suitable subsequent treatment to evaporate the solvent or resolve the emulsion. Steam and air are injected in a controlled ratio to cause a low temperature, controlled oxidation to occur, creating a hydrocarbon cokelike material to form, which bonds the granular material together to form a permeable, rock-like substance which has sufficient permeability to permit flow of fluids therethrough but which has pore space of sufficiently small size to restrain movement of formation sand particles therethrough.

15 Claims, 1 Drawing Figure

U.S. Patent  Aug. 17, 1976  3,974,877
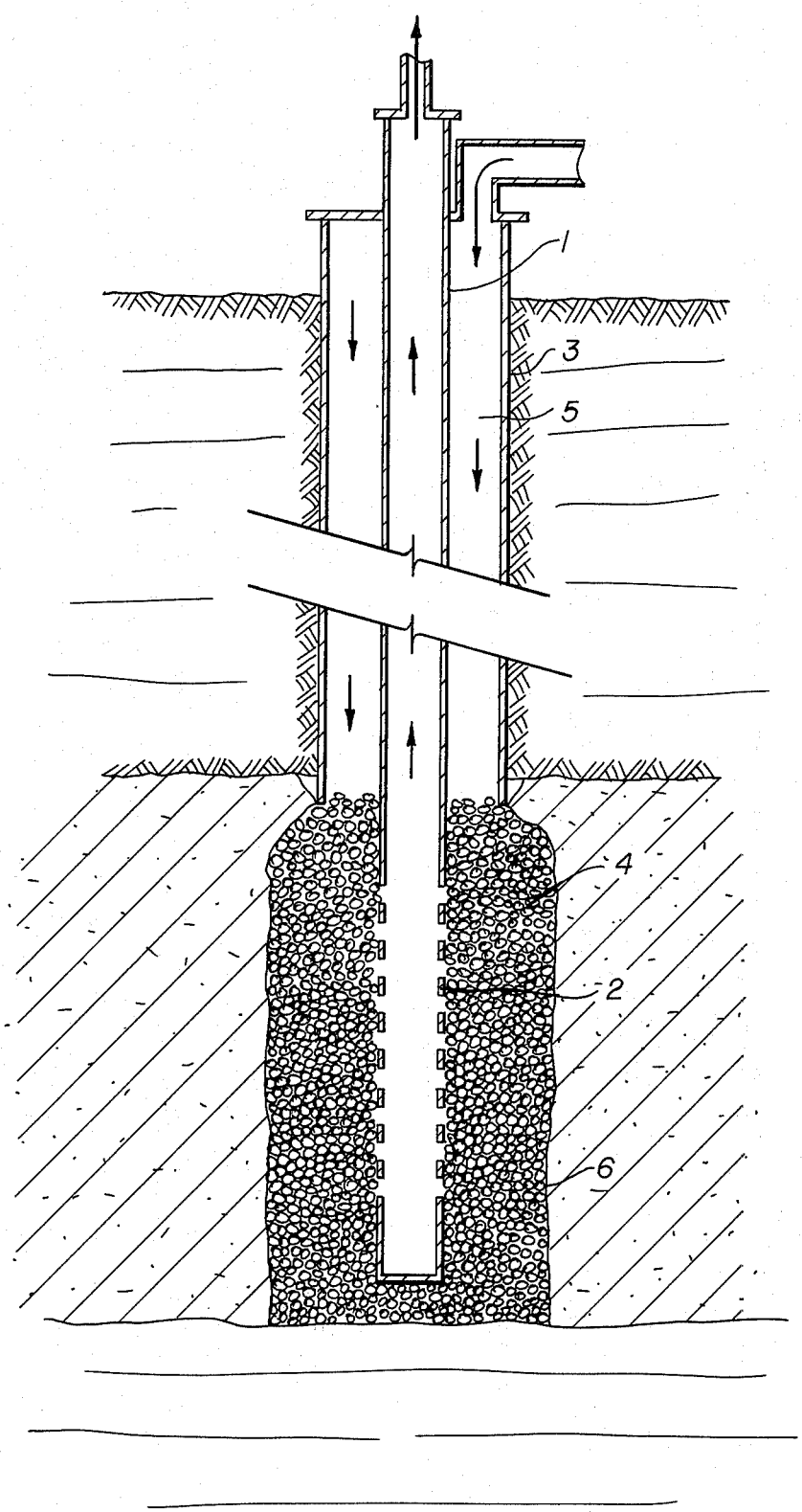

SAND CONTROL METHOD EMPLOYING LOW TEMPERATURE OXIDATION

BACKGROUND OF THE INVENTION

1. Field of the Invention

This invention pertains to a method for treating wells penetrating and completed in subterranean earth formations, and more particularly to a method for treating a petroleum containing formation in the immediate vicinity of a well so as to stabilize unconsolidated sands to prevent their migration into or away from the well. More particularly, this invention pertains to a method of treating such wells with granular material saturated with bitumen and then contacted with steam and air in a controlled ratio to effect low temperature controlled oxidation of bituminous petroleum so as to form a cokelike material which bonds sand or gravel grains together to form a permeable zone around the well to restrain movement of the sand.

2. Prior Art and Background

Recovery of fluids such as gas and/or petroleum from a subterranean formation is frequently found to be troublesome when the subterranean formation is composed of one or more incompetent sand layers or zones. The sand particles in the incompetent or unconsolidated sand zone move or migrate into the well bore during recovery of formation fluids from that particular zone, or sand particles move away from the well during the injection of secondary or tertiary recovery fluids into the formations. In the instance of recovering fluid from the formation, the movement of sand into the well bore can cause the well to cease production of fluids therefrom. Also, small sand particles can plug small openings in porous masses formed around the well bore for the purpose of restraining flow of particulate matter such as sand or gravel into the well, resulting in terminating further production of fluid from that particular well. Another adverse result of sand particle migration from the producing well bore is associated with the fact that fine sand may be transported to the surface of the earth and carried along through pipes, pumps and other surface equipment being used to recover formation fluids. Such sand particles are abrasive, and rapid wear results to the pumps and other mechanical equipment contacted thereby.

Many methods are described in the prior art for preventing or decreasing flow of undesirable sand particles during the course of recovering formation fluids from production wells, such as by the placement of sand screens, filters, perforated or slotted liners, etc. around the well. These prior attempts have been successful in some instances, but have not always been entirely satisfactory for a number of reasons. Mechanical devices frequently restrain only the larger particle size sand, and are not completely effective at restraining or preventing the flow of fine particles from the formation into the well and ultimately into the surface located production equipment. Furthermore, such devices interfere with various types of completion and workover operations. More recently, chemical compositions which bond sand grains together with a resinous plastic material to form a permeable mass which effectively restrains the flow of sand particles from the formation have been proposed in the prior art and used in field operations. These methods usually involve injecting into the subterranean formation a polymerizable resinous material, which can be caused to polymerize later so as to consolidate formation sand to form the desired permeable barrier in the formation. Numerous difficulties have been encountered in commercial application of this technique including the difficulty of achieving even polymerization of the resinous material in the formation to a degree necessary to consolidate these formations, while still maintaining adequate permeability so as to permit flow of formation fluids therethrough. Furthermore, these resinous materials are quite expensive in comparison to the more traditional mechanical methods.

In the instance of recovering viscous petroleum from subterranean formations such as tar sand or bituminous sand deposits some form of treatment which renders the highly viscous petroleum sufficiently mobile that it will flow to the production well and then to the surface of the earth must be used. The most commonly utilized heating fluid for achieving the required viscosity reduction in bituminous petroleum is high temperature steam which is injected into the well with production of steam and emulsified bitumen from remotely located production wells. High temperature steam which frequently also contains appreciable quantities of an alkaline substance such as sodium-hydroxide, cannot be used with resinous sand consolidating materials because these materials are rapidly dissolved or degraded by contact with hot alkaline steam.

In view of the foregoing discussion it can be appreciated that there is a substantial, unfulfilled need for a sand control method capable of preventing flow of unconsolidated sand particles into a well bore or away from a well bore during a period of injection fluids thereinto. More particularly there is a need for an inexpensive, reliable method of controlling sand in a formation having an appreciable quantity of unconsolidated sand particles, which method will result in a permeable mass which will not be affected by subsequent contact with high temperature, alkaline fluids such as steam and caustic.

By the method of the present invention one is able to treat underground formation so as to effect consolidation of granular material such as sand and gravel into a permeable mass which will effectively restrain the movement of unconsolidated sand particles into or out of the well bore, which consolidated permeable mass will not be appreciably effected by subsequent contact with hot alkaline fluids such as steam and caustic and thus avoid many of the disadvantages of the prior art methods, both mechanical and chemical.

SUMMARY OF THE INVENTION

I have discovered that a solid mass with appreciable mechanical strength and sufficient permeability to permit flow of fluid therethrough may be formed in such a way as to control the undesirable flow of formation sand into or away from a well bore during oil recovery from the well or supplimental recovery fluid injection into the well. The method involves the low temperature oxidation of bitumen or bituminous petroleum which occurs when such bituminous petroleum is contacted with steam and an oxygen containing gas, as air. The sand or gravel is placed in the formation adjacent the well bore and saturated with bituminous petroleum. The step of saturating the sand with bituminous petroleum may be accomplished by preheating the sand and bituminous petroleum above about 200°F and preferably to a temperature of about 300°F to render the petroleum pumpable, or a suitable solvent may be mixed with the petroleum and later evaporated by passing an inert gas or air through it to leave the viscous bituminous petroleum deposited on the sand grains. Another method comprises formulating a bitumin-in-water emulsion which may be pumped into the sand or gravel, followed by contacting the emulsion with an acid to break the emulsion. The water is then displaced from the sand leaving the bituminous petroleum on the sand grains. The bituminous petroleum is then contacted with a mixture of air and steam in a ratio from 0.2 to 5.0 standard cubic feet per pound for from 1 to 20 hours to cause a controlled low temperature oxidation reaction to occur, which causes deposition of a solid, carbonacious material on the sand grains. The sand grains are bonded together by the solid carbonaceous material to form a porous, permeable, rocklike material. The permeable solid thus formed is mechanically stable and withstands sustained contact with hot alkaline fluids such as high temperature steam containing sodium hydroxide or caustic.

BRIEF DESCRIPTION OF THE DRAWING

The attached drawing illustrates one well in a tar sand formation being subjected to the method of my invention for forming a sand restraining, permeable mass around the well bore.

DETAILED DESCRIPTION OF THE INVENTION AND DESCRIPTION OF THE PREFERRED EMBODIMENTS

Briefly, the process of my invention involves contacting aggregates such as sand or gravel which are first coated with bituminous petroleum with a mixture of steam and air in order to affect a low temperature, controlled oxidation reaction of the bituminous petroleum. A solid cokelike material is formed as a result of the low temperature oxidation of bituminous petroleum, and this carbonateous material functions as a cementing agent to bind adjacent sand grains or gravel particles together. Since gas is flowing through the matrix during the period when the reaction is occurring, the essential gas permeability is maintained. The solidified carbonaceous material has sufficient mechanical strength to remain intact during the period of formation fluid production, and is essentially insensitive to high pressure steam or other hot fluids utilized in supplimental petroleum recovery operations.

According to one aspect of my invention, the sand and bitumen naturally occurring in a formation such as tar sand deposit is utilized as the granular material and bitumen for the reaction which results in formation of the permeable mass necessary to control sand migration. Accordingly, one embodiment of the process of my invention involves briefly contacting the tar sand material adjacent the injection and/or production well bore penetrating same with a mixture of steam and air for a period sufficient to cause the controlled low temperature oxidation reaction to occur in the immediate vicinity of the well bore, as will be described more fully below. The solid carbonaceous cokelike material resulting from this low temperature oxidation remains in the area immediately adjacent to the well bore, and functions to cement the formation sand grains together.

In a slightly different embodiment of the process of my invention, the required granular material is introduced into the well bore, said granular material being saturated with bitumen prior to placing into the well bore, or being saturated by pumping bituminous petroleum through the granular material after it has been placed in the well bore.

There are several methods for placing the granular material adjacent to the formation in which the sand restraining permeable mass is desired to be formed. In one embodiment, a minor amount of the formation is removed as by washing with water or other suitable fluids including solvents or by underreaming to create a small cavity in the immediate vicinity of the well bore penetrating the unconsolidated sand containing subterranean formation. After a suitable amount of formation material has been removed therefrom, the sand and/or gravel is placed into the well bore for further treatment. The granular material may be slurried in water or other fluid and pumped into the well bore, where it filters and forms a pack against the formation face. Another method illustrated in the attached drawing involves the use of a tubing string 1 with a slotted or perforated liner 2 on the end thereof inside a cased wellbore 3. The granular material 4 is slurried in a suitable fluid such as water and pumped down the annular space 5 between the casing and the tubing. The granular material filters against the slotted liner 2 filling the cavity 6, formed by under reaming and the fluid is pumped back to the surface through the tubing. The granular material thus is formed into a densely packed porous permeable mass 4 ready for further treatment by saturating with bituminous petroleum and then contacting the bitumen saturated granular material with air and steam.

If the sand restraining permeable mass is to be formed from granular material introduced into the well bore according to the above procedure, the optimum results are obtained if the sand particle sizes meet certain specific requirements. The sand component in general should be closely sized within the broad range of 10 to 80 mesh, i.e. 12 to 20 mesh, 20 to 40 mesh, 40 to 80 mesh, etc., to permit effective, relatively high permeability barriers being formed. If sand having a broad range of particle sizes is used, the fine grain sand particles tend to occupy void spaces between adjacent, cemented large grain particles resulting in the formation of a dense, nonporous, low permeability mass. Accordingly, optimum results are achieved if the larger particle sizes utilized are no more than approximately twice the smallest particle size utilized. Frac sand, sand customarily used in petroleum fracturing operations, having a size between 20 to 40 mesh, is very suitable for use in the process of my invention.

Sand particles which are coarser than about 10 mesh and finer than about 80 mesh are not as suitable for use in this composition as sand particles within the 10 mesh to 80 mesh range. Coarser particles are not satisfactory because the resultant set, coke-cemented barrier pore sizes are so great that fine sand particles can move freely there-through and into the production well. Very fine sand particles, i.e. those particles finer than 80 mesh, are unsuitable because the resultant permeable barrier has insufficient permeability to permit the flow of formation fluids therethrough.

The bituminous petroleum, especially that obtained from a tar sand deposit, will ordinarily be much too viscous to be pumped into the sand pack. The viscosity of bituminous petroleum normally is in the millions of centipoise at formation temperature; however, the viscosity-temperature relationship is very sharp. The viscosity of bituminous petroleum typically drops to a value of a few centipoise at 300°F. Accordingly, the bituminous petroleum may be heated to a temperature of at least 200°F and preferably around 300°F. The sand may also be heated to a similar temperature, and this is conveniently accomplished by passing a heated fluid such as steam through the sand prior to pumping the heated bituminous petroleum into the formation.

Another method for coating the granular material with bituminous petroleum involves formation of an oil-in-water emulsion which normally has a much lower viscosity than the petroleum. The desired emulsion may be formed by mixing a quantity of bituminous petroleum and water, the ratio of oil-to-water being from about 1.0 to 0.01 and preferably about 0.10. The emulsion formation is aided by including a small amount of an alkaline material such as sodium hydroxide in the water. Generally from about 0.01% to about 1% sodium hydroxide is satisfactory for this purpose.

After the bitumen-in-water emulsion has been formulated it is pumped down the tubing and/or the annular space between the tubing and casing and into the granular material adjacent the liner. Once the granular material is saturated with the bitumen-in-water emulsion, an acid such as hydrochloric acid or sulfuric acid is introduced into the emulsion saturated gravel or sand pack. Generally the volume of acid may be from about 1% to 50% of the volume of emulsion present. The concentration of acid is preferably from about 1% to about 10%. When the bitumen-in-water emulsion is contacted by the acid, the emulsion is "broken" or resolved into its separate phases. Bitumen is quite viscous, so it remains in the pores of the sand or gravel pack, while the water phase is easily displaced out of the pack.

Still another method for saturating the sand or gravel pack with bituminous petroleum comprises contacting the petroleum with a solvent such as benzene, toluene or naphtha to render the bituminous petroleum pumpable, and the solution of bituminous petroleum and solvent may then be pumped into the sand or gravel pack through the tubing or annulus or both. A suitable gas such as air, nitrogen, carbon dioxide or natural gas may then be passed through the sand or gravel pack to vaporize the solvent, leaving the viscous bituminous petroleum in the sand or gravel pack. The vaporization may be accelerated if an inert gas such as nitrogen is heated to a temperature well above the boiling point of the solvent prior to passing the gas through the sand pack.

The low temperature, controlled oxidation reaction which constitutes the final phase of the process of my invention differs substantially from conventional oxidation as applied to in situ oil recovery operations. When air is injected into a formation and sufficient heat is supplied initially to initiate a combustion reaction within the formation, a high temperature combustion reaction zone is created in the formation which will propagate therethrough if air injection is continued. Ignition of the formation for this type of operation, referred to as in situ combustion, is conveniently accomplished by means of a downhole gas fired heater or a downhole electric heater or by chemical means. Once ignition has occurred, injection of an oxygen containing gas is continued so as to maintain the combustion front and to drive the front through the formation toward the production well.

The temperature of a combustion front generated in conventional in situ combustion operations is usually in the range of from about 750° to about 1100°F. The heat generated in this zone is transferred to the distillate and cracking zone ahead of the combustion front where crude oil undergoes distillation and cracking. A sharp thermal gradient exists within this zone, wherein the temperature drops from the 750°–1100°F combustion front temperature to about 300°–450°F. Ahead of the combustion front, temperatures rise sufficiently above ambient temperature to carbonize or deposit in solid form, the higher molecular weight hydrocarbon materials existing within the formation petroleum fluid. Lower molecular weight species of the formation petroleum are vaporized or mobilized sufficiently to be driven ahead, and the heavier molecular weight materials remain deposited on the sand grain. The cokelike materials deposited on the matrix are the fuel utilized in the main in situ combustion front as it passes through this region. Accordingly, after a conventional in situ combustion reaction has progressed to the point that these various reaction zones have been established, essentially no carbonaceous material remains in the formation after the final combustion front has passed therethrough. It can be seen that application of a conventional high temperature combustion reaction in the process of my invention would not be satisfactory, since the high molecular weight hydrocarbon materials originally deposited on the sand grains would be consumed by the high temperature reaction zone passing therethrough, leaving relatively clean sand in an unconsolidated state. Additionally, the temperatures generated within the conventional in situ combustion front are so high as to generate considerable thermal stresses both within any consolidated mass that may have occurred from formation of a cokelike material and also to cause substantial damage to any metallic elements such as screens or perforated or slotted liners which may be present.

The oxidative reaction occurring in the application of the process of my invention differs substantially from that described above. The temperature of the oxidation reaction is controlled to a value from about 300°–500°F., with temperatures about 450°F. being preferred. The low temperature, controlled oxidative reaction zone or combustion front travels through a formation much faster than does the higher temperature, more convention in situ combustion type reaction described above. Because the temperatures in the low temperature reaction are much lower, coke deposited as a result of thermal cracking and distillation of petroleum in situ within the formation is not burned by the low temperature combustion reaction.

In the practice of the low temperature controlled oxidation reaction necessary to accomplish the cementation by petroleum coke formation, an oxygen containing gas, generally air, and steam are injected simultaneously into the formation. Either superheated or saturated steam is satisfactory and saturated steam is preferred since the equipment for generating saturated steam is generally less expensive to obtain and operate than that equipment for generating superheated steam. Air and steam are injected simultaneously during most of the treating period necessary to accomplish coke cementation of the sand or gravel particles.

One particularly effective method for utilizing this process is to inject steam at a temperature corresponding to the temperature of saturated steam at the pressure existing within the formation, or at a pressure slightly greater than the natural pressure existing within the formation. Ordinarily, the temperature of steam injected into the formation will be from about 300°F. to about 700°F.

The ratio of air to steam being injected into the formation may be from about 0.1 to about 5.0, and the preferred range is from 0.2 to about 0.7 standard cubic feet of air per pound of steam. The contact time is from about 1 to about 20 hours, and preferably from 5 to 10 hours. Generally the contact time necessary for complete reaction increases as the reaction temperature decreases.

The process of my invention will be better understood by reference to the following field examples, which are offered only for purposes of illustration and are not intended to be limitative or restrictive thereof.

FIELD EXAMPLE I

A tar sand deposit approximately 75 feet thick is located under an overburden layer of 350 feet, and exploitation is undertaken using a steam emulsification drive process. This process requires the establishment of a communication zone by fracturing and subsequent treatment to enlarge the fraction into a stable communication path, followed by injecting a mixture of saturated steam and caustic soda into the permeable communication path. In order to stabilize the well bore of the injection well, and further to control sand migration in the production well bore, some sand control treatment must be utilized.

An aromatic solvent which is approximately 70% mixed monocyclic aromatic hydrocarbons and 30% aliphatic hydrocarbons, is pumped down a tubing string bottomed near the bottom of the tar sand deposit, which contacts and dissolves a substantial portion of the bitumen in the immediate vicinity of the well bore. The fluid passes back to the surface of the earth via the annular space, and carries both bitumen dissolved by the solvent and a portion of the sand suspended therein to the surface of the earth. After approximately 2 hours of this treatment, a cavity extending an average of 3 feet into the tar sand deposit is created, being relatively uniform from top to bottom.

A slurry of 20–40 mesh frac sand in water is formulated and pumped down the tubing. The sand filters out against the formation face, and as a result of this treatment essentially clean sand is packed against the formation face. It is necessary to raise the tubing slightly during this phase of the operation in order to obtain uniform packing of sand against the formation.

Steam is pumped through the sand pack to preheat it to 300°F. Bituminous petroleum is heated to a temperature of 300°F and pumped into the preheated sand pack. Fifteen barrels of bituminous petroleum are used to saturate the sand pack.

The output of an air compressor is connected to the tubing and air is injected into the bituminous petroleum saturated sand. A steam generator is also installed on the surface, and the output is mixed with compressed air. Steam at a temperature of 375°F is injected into the sand pack one hour after which a mixture of air and steam are injected into the formation for a period of 8 hours. The volume ratio of air to steam is approximately 0.4 standard cubic feet of air per pound of steam. The exposure time is 8 hours.

After completion of the final phase of this consolidation procedure, a permeable mass is formed adjacent each well bore with sufficient permeability to permit injection of steam thereinto in the instance of the injection well, and production of the bitumen-in-water emulsion produced as a result of the steam emulsification drive oil recovery process.

FIELD EXAMPLE II

Recovery of petroleum from a petroleum-sand formation is complicated by a serious unconsolidated sand problem. Sand is flowing together with a petroleum fluid into the production well, causing the well to stand up and production to terminate. Furthermore, fine grain sand is being produced which is causing rapid wear of the pumps being utilized to transport the petroleum to gathering facilities on the surface. A conventional gravel pack liner is ineffective because the sand particle sizes are sufficiently small to pass through the liner, and sand and gravel are displaced away from the injection well as fluids are pumped therein. Conventional polymerized resin bonded sand is not satisfactory for this application because oil production is being stimulated by a push-pull steam injection process, and steam quickly dissolves the resin and permits the consolidated sand to crumble.

The formation adjacent each well bore is first underreamed to create a void averaging 4 feet in diameter sufficient to accommodate the gravel. The wells are cased to the top of the petroleum saturated interval. A slotted liner is attached to the end of each tubing string and the string is run into the well, the liner being positioned near the mid point of the petroleum formation. A slurry of 30–60 mesh clean sand in water is pumped down the annulus and water is withdrawn from the downhole region through the tubing, causing the sand to filter out and pack against the slotted liner. A sand pack is formed by this method extending several feet into the formation, filling the void formed by underreaming. Approximately 50 gallons of an emulsion of viscous, bituminous petroleum-in-water is formed and pumped into the sand pack. A 5% hydrochloric acid solution is then pumped into the emulsion-saturated sand pack to break the emulsion and deposit bitumen on the sand grain.

Steam is then injected into the viscous petroleum saturated gravel pack for 30 minutes to preheat the bitumen saturated gravel pack. After approximately 30 minutes of steam injection, a mixture of 375°F steam and air are injected into the petroleum saturated gravel pack, in order to control the reaction temperature and insure that a low temperature, controlled oxidation reaction occurs rather than a high temperature reaction which would burn all of the petroleum material off the surface of the sand. The air steam mixture has a ratio of 0.5 standard cubic feet of air per pound of steam. After 4 hours the petroleum material has been oxidized at a low temperature to produce a deposition of a solid, cokelike material on the grains of sand in the sand pack, after which the grains are completely bonded together to form a porous, permeable rocklike material having a permeability of 3500 millidarcies.

Resumption of push-pull steam stimulation is undertaken, and production of essentially sand-free petroleum is obtained. Passage of alkaline steam through the gravel pack does not result in deterioration of the cokelike material cementing the gravel grains together.

EXPERIMENTAL

In order to illustrate the operability of the process of my invention, and further to establish the controllable parameters, the following experimental work was performed. Approximately 180 pounds of tar sand obtained from the McMurray formation in Alberta, Canada was packed into a laboratory cell which measured approximately 15 inches long and 18 inches in diameter. Suitable injection and production means are included in the cell.

A mixture of air and 650°F superheated steam (0.4 standard cubic feet of air per pound of steam) was passed through the tar sand material for 7 hours. The cell was then opened and examined. A solid mass was observed. The permeability of the coke-sand mixture was from 28–36% and the permeability was from 3980 to 4460 millidarcies. The material was so hard and competent that it was necessary to chisel it out of the cell.

While my invention has been described in terms of a number of illustrative embodiments, it is not so limited since many variations thereof will be apparent to persons skilled in the related art without departing from the true spirit and scope of my invention. Similarly, while a mechanism has been proposed to explain the benefits resulting from the application of my invention, it is not my intention to be bound by any particular theory or explanation. It is my intention that my invention be limited and restricted only by such limitations and restrictions as are included in the appended claims.

I claim:

1. A method of treating a subterranean, petroleum containing formation penetrated by at least one well, said well being in fluid communications with the subterranean formation, for the purpose of forming a permeable solid barrier which restrains the movement of sand particles and permits passage of fluid therethrough, comprising:
   a. introducing a predetermined quantity of granular material in the well bore adjacent the formation;
   b. introducing bituminous petroleum into the granular material by forming a bituminous petroleum-in-water emulsion, pumping the emulsion into the granular material, and then contacting the emulsion in the granular material with an acid to break the emulsion and deposit bitumen on the granular material; and
   c. injecting a mixture of steam and an oxygen containing gas into the bituminous petroleum granular mixture for a predetermined period of time sufficient to form a competent, permeable solid.

2. A method is recited claim 1 wherein the granular material is sand.

3. A method is recited in claim 2 wherein the particle size of the sand is from 10 to 80 mesh.

4. A method of recited in claim 3 wherein the particle size of the largest grain contained therein is not more than twice the particle size of the smaller grains contained therein.

5. A method as cited in claim 1 wherein the particulate matter is introduced into the well bore by forming a slurry of a particular matter in a fluid and pumping the slurry into the well, so that the particulate matter forms a cake against the face of the subterranean formation.

6. A method as recited in claim 1 wherein the well is completed with a casing and a liner having openings therein attached to the end of tubing is placed in the cased well and the step of introducing the granular material into the well bore adjacent the formation is accomplished by forming a slurry of the granular material in a suitable fluid including water and pumping the slurry into the annular space between the tubing and casing and pumping the fluid up the tubing, so that the granular material filters out against the perforated liner to form a pack of granular material.

7. A method is recited in claim 1 wherein the steam is saturated and its temperature is in a range of from about 250° to about 500°F.

8. A method as recited in claim 1 wherein the steam is supersaturated.

9. A method is recited in claim 1 wherein the volume ratio of air to steam is from about 0.2 to about 5.0 standard cubic feet of air per pound of steam.

10. A method is recited in claim 1 wherein the oxygen containing gas is air.

11. A method is recited in claim 1 wherein the oxygen containing gas is substantially pure oxygen.

12. A method as recited in claim 1 wherein the granular material is heated to a temperature of at least 200°F prior to the step of introducing the bituminous petroleum into the sand pack.

13. A method of treating a subterranean, petroleum containing formation penetrated by at least one well, said well being in fluid communication with the subterranean formation, for the purpose of forming a permeable solid barrier which restrains the movement of sand particles and permits passage of fluid therethrough, comprising:
   a. introducing a predetermined quantity of granular material into the wellbore adjacent the formation;
   b. introducing bituminous petroleum into the granular material by forming a solution of bituminous petroleum in an effective solvent, introducing the solution into the granular material and passing a gas through the solution in the granular material to vaporize the solvent and leave the bituminous petroleum in the granular material; and then
   c. injecting a mixture of steam and oxygen-containing gas into the bituminous petroleum granular mixture for a predetermined period of time sufficient to form a competent, permeable solid.

14. A method as recited in claim 13 wherein the solvent is an aromatic or aliphatic hydrocarbon solvent.

15. A method as recited in claim 13 wherein the gas is selected from the group consisting of air, carbon dioxide, methane, nitrogen, and mixtures thereof.

* * * * *